Patented Dec. 15, 1931

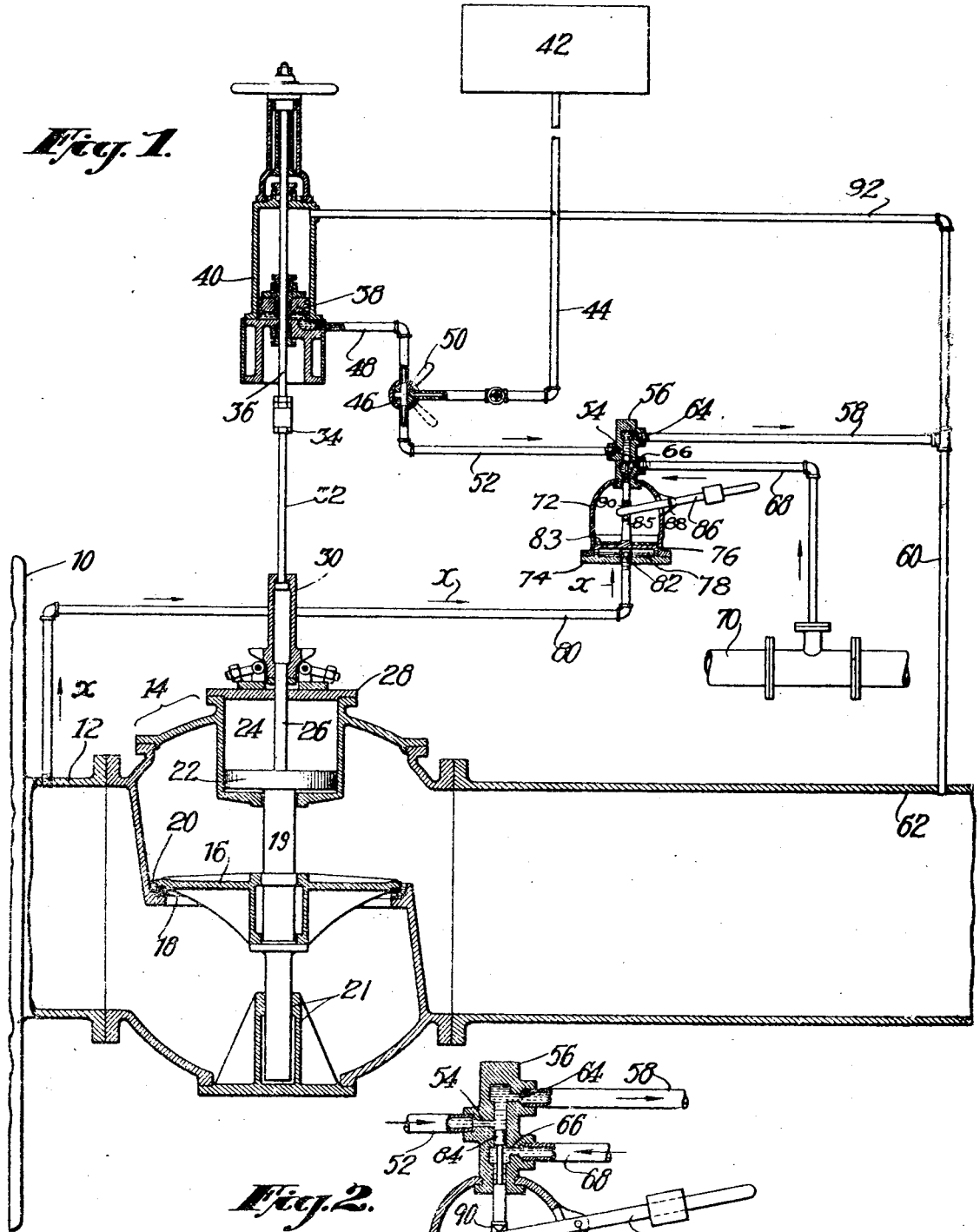

1,837,007

UNITED STATES PATENT OFFICE

HENRY G. WOLFE, OF WHITE PLAINS, NEW YORK, AND JAY A. FREIDAY, OF EAST ORANGE, NEW JERSEY, ASSIGNORS, BY MESNE ASSIGNMENTS, TO METROPOLITAN ENGINEERING CORPORATION, OF NEW YORK, N. Y., A CORPORATION OF NEW YORK

RELIEF VALVE

Application filed August 5, 1925. Serial No. 48,218.

This invention relates to automatic means adapted to operate a relief valve such as used in connection with surface condensers. The objects and advantages of the invention will be apparent from the following specification when read in connection with the accompanying drawings and the points of novelty will be pointed out with particularity in the appended claims.

In the drawings Fig. 1 is a sectional view showing a relief valve and associated mechanism embodying our invention.

Fig. 2 is an enlarged sectional view of a pressure actuated device adapted to automatically control the operation of the relief valve.

Referring in detail to the drawings, 10 is a conventional representation of a condenser which is connected by means of a pipe 12 with a condenser relief valve of known construction indicated at 14. This valve 14 includes a valve disc 16 which normally rests firmly on a seat 18 and is provided with a water seal indicated at 20 for preventing leakage past the valve. The disc 16 is secured to a stem 19, the lower end of which is guided in a suitable bearing 21 secured to the casing of the valve 14. At its upper end the stem 19 carries a piston 22 which operates in a dashpot cylinder 24. A stem 26 passes freely through the cylinder head 28 of the dashpot and is connected to a coupling 30 which in turn is connected to a rod 32. This rod is joined by a coupling 34 to the piston rod 36 which is secured to a piston 38 of a fluid pressure motor 40.

Fluid can be supplied to the motor 40 under manual control and also under automatic control. A manually controlled supply of fluid to the motor 40 is located in a roof tank 42 which is located at an elevation sufficient to give a head capable of forcing the piston 38 upward. The roof tank is connected by means of a pipe 44 with a three-way valve 46 which in turn is connected by a pipe 48 with the lower end of the cylinder of the fluid pressure motor. When the handle 50 and the plug of the three-way valve are in the position shown in full lines, the fluid from the cylinder of the motor can flow freely through pipe 52 and through the open port 54 of a valve 56 by way of pipes 58 and 60 to an exhaust main 62 which is open to atmosphere.

The valve 56 is formed with ports 64 and 66, the latter communicating with a pipe 68 which is connected with a pipe 70 leading to a source of pressure such as water or steam.

Communication between the pipe 52 and the pipes 68 and 58 is controlled by a device operable in response to variations in pressure in the pipe 12 which it will be remembered connects with the vacuum side of the relief valve 14. This device includes a casing 72, the lower end of which is closed by a head 74. A piston 76 is seated within the casing 72, said piston being adapted to be lifted by pressure within the chamber 78 on the underside thereof. The chamber 78 is connected by means of pipe 80 with the vacuum pipe 12 and a check valve 82 is provided to normally prevent the flow contrary to the direction indicated by the arrows X. A liquid seal 83 prevents leakage past the piston.

The piston 76 is provided with a stem 85 which carries at its upper end a piston slide valve 84. A weighted lever 86 pivoted at 88 engages suitable abutments 90 formed on the piston stem 85 and tends to balance the weight of the piston 76 and the stem 85. The position of the weight on the lever 86 can be adjusted to determine the excess pressure at which the piston 76 will be lifted.

Under normal operating conditions a vacuum is maintained in the condenser 10 and also in the pipe 12. Under these conditions there is practically no pressure in the chamber 78 and the fluid can drain from pipes 48 and 52 through ports 54 and 64 and pipes 58 and 60 to the exhaust pipe 62.

On the other hand when pressure builds up in the condenser due to its failure to properly condense the steam, such pressure will be communicated through pipe 80 to the chamber 78. The pressure building up in this chamber will cause the piston 76 to be lifted and thereby raise the piston slide valve 84 so as to open communication between ports 54 and 66. This will permit fluid under high pressure to flow from pipe 70 through pipes 68, 52 and 48 to the underside of the piston 38 of the fluid pressure motor 40. The piston 38 on its upward movement will thus automatically lift the valve disc 16 off its seat and permit the steam from the condenser 10 to escape to the exhaust pipe 62.

On its upward stroke the piston 38 ejects the pocketed air in the top of the cylinder 40 through a vent pipe 92 which is connected to pipe 60.

While we have described the specific details of the embodiment of the invention illustrated, it is not to be construed that we are limited thereto as various modifications may be made by those skilled in the art without departing from the invention as defined in the appended claims.

What we claim is:—

1. Relief valve mechanism of the class described including a relief valve comprising a valve body having two chambers, one being adapted to connect with a vacuum pipe and the other being adapted to connect with an exhaust pipe, a valve disc controlling communication between said two chambers, a valve stem secured to said disc and carrying a piston, a dash pot within which said piston moves, a fluid motor directly connected with said valve stem and means for automatically controlling the supply of fluid pressure to said motor comprising a device including a casing having a piston movable therein, a pipe communicating with said device and the vacuum chamber of said valve body, a source of fluid pressure, a valve actuated by the last named piston controlling communication between said source of fluid pressure and said fluid motor.

2. Relief valve mechanism of the class described including a relief valve comprising a valve body having two chambers, one being adapted to connect with a vacuum pipe and the other being adapted to connect with an exhaust pipe, a valve disc controlling communication between said two chambers, a valve stem secured to said disc, a fluid motor having a piston operatively connected with said valve stem and a device for automatically controlling said fluid motor comprising a casing having an adjustably counterbalanced piston therein, means for transmitting pressure from the vacuum chamber of said valve body to one side of the last named piston, a source of fluid pressure, a valve directly connected to and actuated by said counterbalanced piston controlling the flow of fluid from said source to said fluid motor.

3. Relief valve mechanism of the class described including a relief valve comprising a valve body having two chambers, one being adapted to connect with a vacuum pipe and the other being adapted to connect with an exhaust pipe, a valve disc controlling communication between said two chambers, a valve stem secured to said disc, a fluid motor having a piston directly connected with said valve stem and a device for automatically controlling said fluid motor comprising a casing having a piston therein, means counterbalancing the weight of said piston means for transmitting pressure from the vacuum chamber of said valve body to one side of the last named piston, a source of fluid pressure and means controlling the supply of fluid to said fluid motor and the exhaust of fluid from said motor including a valve casing having ports 54 and 66 therein, a piston valve secured directly to the last named piston controlling communication between said ports, and a discharge duct connected with said valve casing.

4. Relief valve mechanism of the class described including a relief valve comprising a valve body having two chambers, one being adapted to connect with a vacuum pipe and the other being adapted to connect with an exhaust pipe, a valve disc controlling communication between said two chambers, a valve stem secured to said disc, a fluid motor having a piston operatively connected with said valve stem and a device for automatically controlling said fluid motor comprising a casing having a piston therein, means for transmitting pressure from the vacuum chamber of said valve body to one side of the last named piston, a source of fluid pressure, a valve actuated by said last named piston controlling the flow of fluid from said source to said fluid motor, an auxiliary means for manually controlling said fluid motor including an overhead tank located at such an elevation that it provides a head of water sufficient to actuate said fluid motor and a manually operable valve controlling the flow of water from the tank to the fluid motor.

5. Relief valve mechanism comprising a valve body having two chambers, one being adapted to connect with a vacuum pipe and the other being adapted to connect with an exhaust pipe, a valve disc controlling communication between said two chambers, a fluid motor operatively connected with the valve disc, a source of comparatively low pressure, means for controlling communication between the latter and said fluid motor, and an automatic emergency device adapted to operate only when a pressure builds up in said vacuum chamber, said device comprising a casing having a fluid actuated member therein, means for transmitting pressure from the vacuum chamber of said valve body to one side of the fluid actuated member in said casing, a source of comparatively high pressure fluid, a valve actuated by said fluid actuated member controlling the flow from said source of high pressure fluid to said fluid motor.

In witness whereof, we have hereunto signed our names.

HENRY G. WOLFE.
JAY A. FREIDAY.

CERTIFICATE OF CORRECTION.

Patent No. 1,837,007. Granted December 15, 1931, to

HENRY G. WOLFE ET AL.

It is hereby certified that the name of the assignee in the above numbered patent was erroneously written and printed as "Metropolitan Engineering Corporation", whereas said name should have been written and printed as Metropolitan Engineering Company, as shown by the records of assignments in this office; and that the said Letters Patent should be read with this correction therein that the same may conform to the record of the case in the Patent Office.

Signed and sealed this 16th day of February, A. D. 1932.

(Seal)

M. J. Moore,
Acting Commissioner of Patents.